(12) United States Patent  
Chapman (10) Patent No.: US 12,197,977 B1  
(45) Date of Patent: Jan. 14, 2025

(54) PRINTED TINY TEXT

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/384,360

(22) Filed: Oct. 26, 2023

(51) Int. Cl.
*B41M 3/14* (2006.01)
*G06K 15/02* (2006.01)

(52) U.S. Cl.
CPC ............ *G06K 15/1843* (2013.01); *B41M 3/14* (2013.01); *G06K 15/184* (2013.01)

(58) Field of Classification Search
CPC .... G06K 15/1843; G06K 15/184; B41M 3/14
USPC ......................... 358/1.2, 3.31, 1.11
See application file for complete search history.

(56) References Cited

U.S. PATENT DOCUMENTS

| | | | | |
|---|---|---|---|---|
| 5,311,607 | A * | 5/1994 | Crosby | G06V 30/1463 382/296 |
| 7,965,422 | B2 | 6/2011 | Hains et al. | |
| 10,462,326 | B2 | 10/2019 | Chapman | |
| 11,677,891 | B1 | 6/2023 | Li et al. | |
| 2004/0012647 | A1* | 1/2004 | Sanger | H04N 1/6011 347/14 |
| 2006/0008114 | A1* | 1/2006 | Sekiguchi | H04N 1/00331 358/1.14 |
| 2007/0247649 | A1* | 10/2007 | Kanematsu | B41J 2/14016 358/1.9 |
| 2012/0269433 | A1 | 10/2012 | Fan et al. | |
| 2013/0278971 | A1* | 10/2013 | Safonov | G06K 15/1881 358/2.1 |
| 2023/0166550 | A1 | 6/2023 | Chapman | |

FOREIGN PATENT DOCUMENTS

DE 102014216238 A1 2/2015

OTHER PUBLICATIONS

"Xerox Develops MicroText to Prevent Forging," Sep. 17, 2006, https://www.firstpost.com/tech/news-analysis/xerox-develops-microtext-to-prevent-forging-3548687.html.

"Xerox® Specialty Imaging: Fraud Deterrent Technology," 2023, https://www.xerox.com/en-us/digital printing/fraud-deterrent-technology.

B. Svilicic, et al., "Microtext Design for Digital Printing Techniques," International Design Conference—Design 2002 Dubrovnik, May 14-17, 2002.

(Continued)

*Primary Examiner* — Jamares Q Washington
(74) *Attorney, Agent, or Firm* — Ortiz & Lopez, PLLC; Luis M. Ortiz; Kermit D. Lopez (57) ABSTRACT

Methods and systems for defining characters, can involve selectively removing pixels from one or more characters and rendering a character with a user space equivalent to a device space. Multiple abutting non-line pixels can be removed among the pixels from the character(s). Furthermore, the character(s) including the multiple abutting non-line pixels as expected for the character(s) can be created prior to prior to selectively removing the pixels from the character(s). This approach can avoid partially marked pixels by setting user space equal to device space and then selectively removing pixels when printing microtext. Selective pixel removal allows for more white space and better recognition of characters such as, for example, "8" and "E".

17 Claims, 9 Drawing Sheets

(56) References Cited

OTHER PUBLICATIONS

Mike Hanlon, "Xerox develop MicroText font—1/100th of an inch high", Sep. 15, 2006, https://newatlas.com/xerox-develop-microtext-font-1100th-of-an-inch-high/6151/.

"Fraud-Resistant Effects That Protect Your Most Sensitive Documents," 2019, Xerox Corporation.

* cited by examiner

PRINTED TINY TEXT

TECHNICAL FIELD

Embodiments are related to image processing methods, systems and devices. Embodiments also relate to printing devices and techniques. Embodiments further relate to methods, devices, and systems for rendering specialty imaging effects such as printed microtext.

BACKGROUND

In conventional printing processes that require security measures, specialty imaging can be used to provide security measures and assist in preventing the counterfeiting of printed materials. A pattern color space having specialty imaging characteristics can be used to provide such security measures. In addition, in conventional printing processes, a pattern color space has been utilized, in part on variable data, such as printing logos, serial numbers, seat locations, or other types of unique identifying information on printed materials.

In security applications, it is desirable to add information to a document that prevents or hinders alterations and counterfeiting. These security elements may conflict with the overall aesthetics of the document.

Specialty imaging has been used, conventionally, in printed materials to provide fraud protection and anti-counterfeiting measures. Some examples are in prescriptions, contracts, documents, coupons, and tickets. Typically, several specialty imaging techniques may be used at various positions in a document. However, specialty imaging text techniques take up space in the document.

One specialty imaging to address the issue of real estate or space in media such as a document involves specialty imaging microtext, which is a well-known security printing product.

Figure 1:
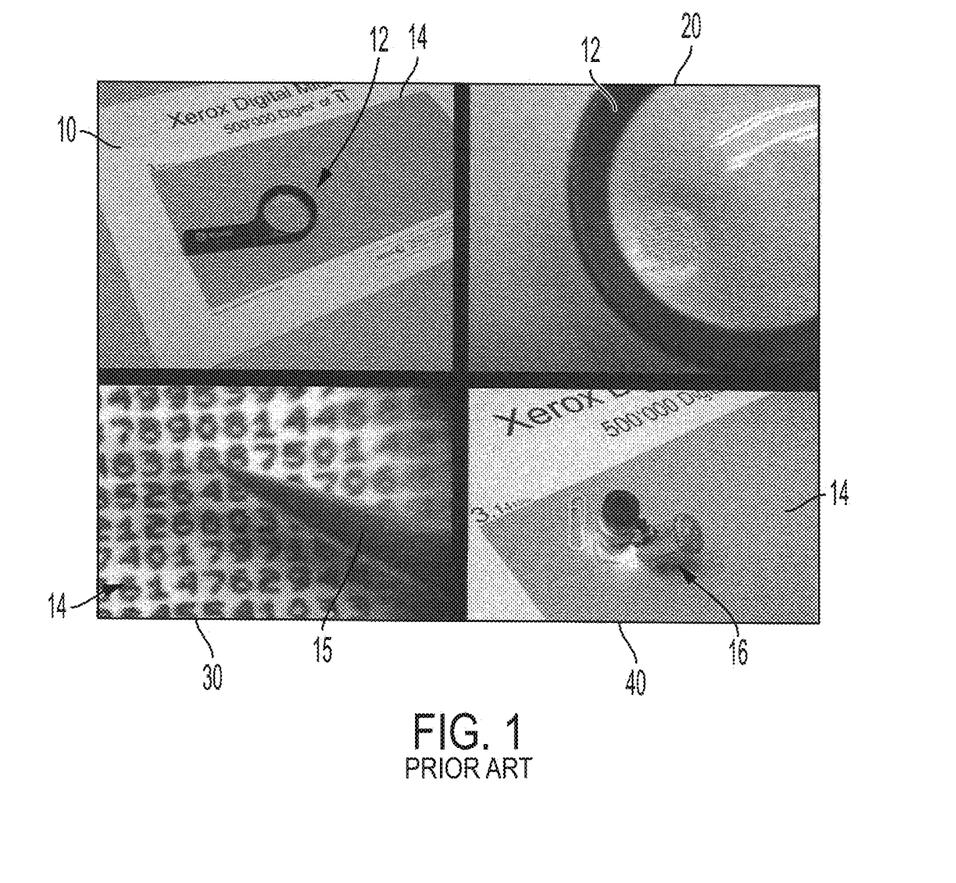
FIG. 1 illustrates a group of images depicting various magnifications of a loupe with respect to microtext.

FIG. 1 illustrates a group of images 10, 20, 30, and 40 depicting various magnifications of microtext 14 with and without a loupe 12, in accordance with an embodiment. FIG. 1 thus depicts examples of specialty imaging effects that are difficult to read. Microtext 14 is shown in pictorial view 10 rendered on a document but may only be viewed with magnification such as the loupe 12 shown in images 10, 20 and 30.

Note that a loupe is a small magnification device that can be used to see small details more closely. Loupes generally have higher magnification than a magnifying glass and are designed to be held or worn close to the eye. A microscope can also work in place of such loupes. Any device that allows for magnification such as a loupe, microscope, etc. can be used to review the microtext 14. In image 40, for example, a compact magnification device 16 is shown which can be used to view the details of the microtext 14. Image 30 shows the details of the microtext 14 with respect to the tip of a fine pointing device 15.

Microtext such as microtext 14 is generally unreadable without magnification and is degraded enough when copying to become unreadable with magnification The current smallest size is micro_f6 which is printed at 0.72 points or 6/72 of an inch on a 600 dpi device. It was considered the smallest size that could be obtained by the Xerox Specialty Imaging team. In a PDL (page description language) such as PDF or PostScript you view in scalable user space so a tiny character e.g., "8" looks fine on screen when zooming. When converting to device space each pixel that is partially marked in user space is marked in device space so there is little to no white space left in the interior of the "8" in device space. When printing there tends to be even less white space due to dot gain.

Microtext generally works well across a number of product lines with the exception of some low-resolution devices. One issue with printing tiny text is dot gain which is the difference between the dot size requested and dot size printed.

Figure 2:
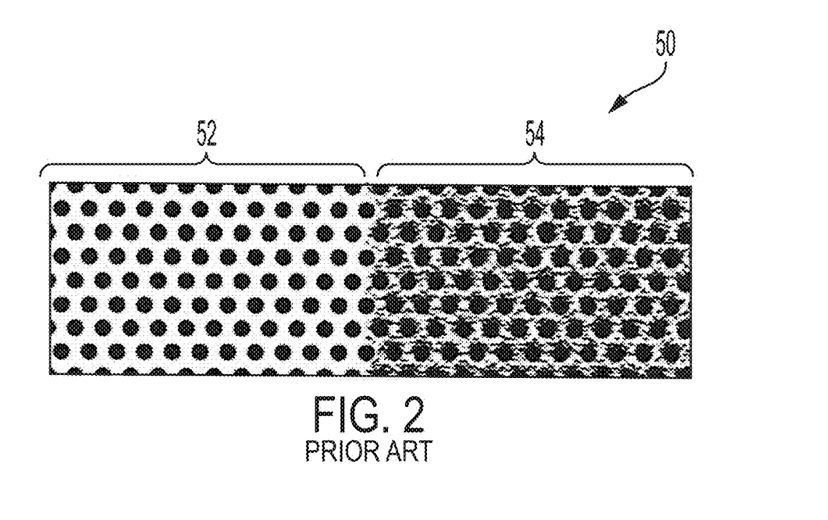
FIG. 2 illustrates an example zoomed image demonstrating dot gain.
Figure 3:
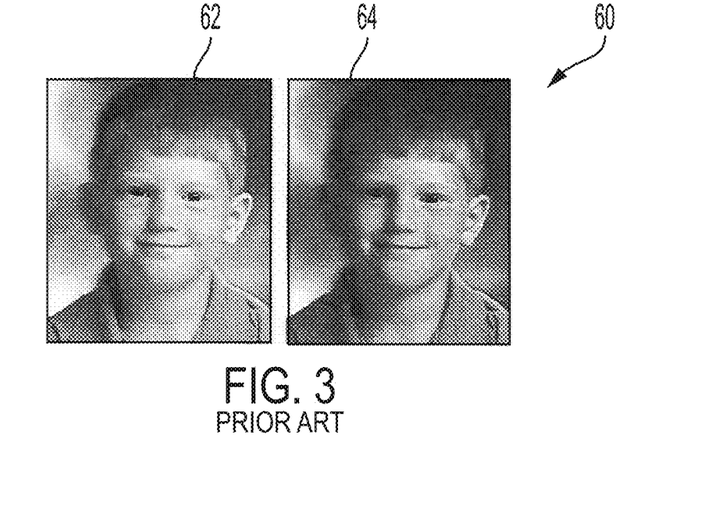
FIG. 3 illustrates an another example image demonstrating dot gain.

FIG. 2 illustrates an example zoomed image 50 demonstrating dot gain, as shown in sub-images 52 and 54. Note that the sub-image 52 shown at the left hand side of image 50 is clearer than the sub-image 54 illustrated at the right-hand side of image 50. FIG. 3 illustrates an another example demonstrating dot gain shown in a group 60 of images including an image 62 and an image 64.

Dot gain is a phenomenon in printing where the dots of ink or toner on a printed surface appear larger than they should be compared to the original image or design. This happens because the ink or toner spreads slightly as it is transferred onto the printing substrate, such as paper or a security document. Dot gain can be a problem in various printing applications, including printing involving microtext because it can compromise legibility, security features, aesthetics, and overall document quality.

Figure 4:
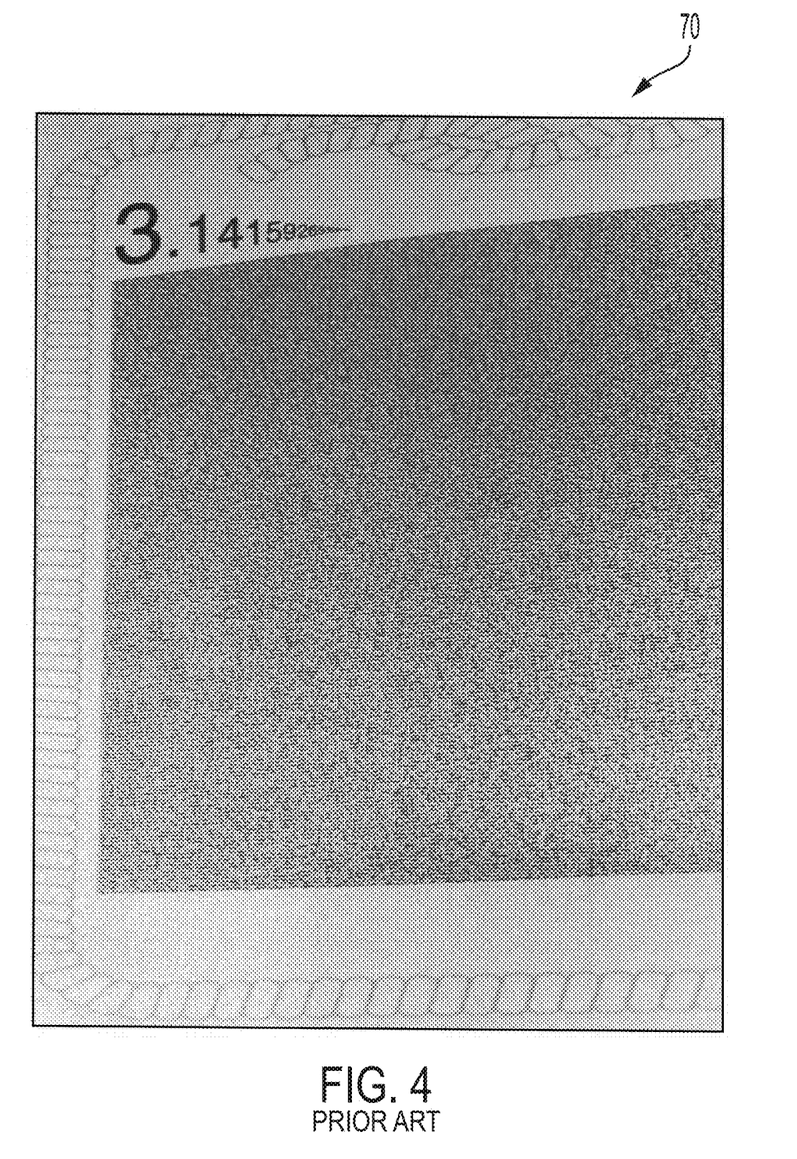
FIG. 4 illustrates an image depicting an example of color microtext.
Figure 5:
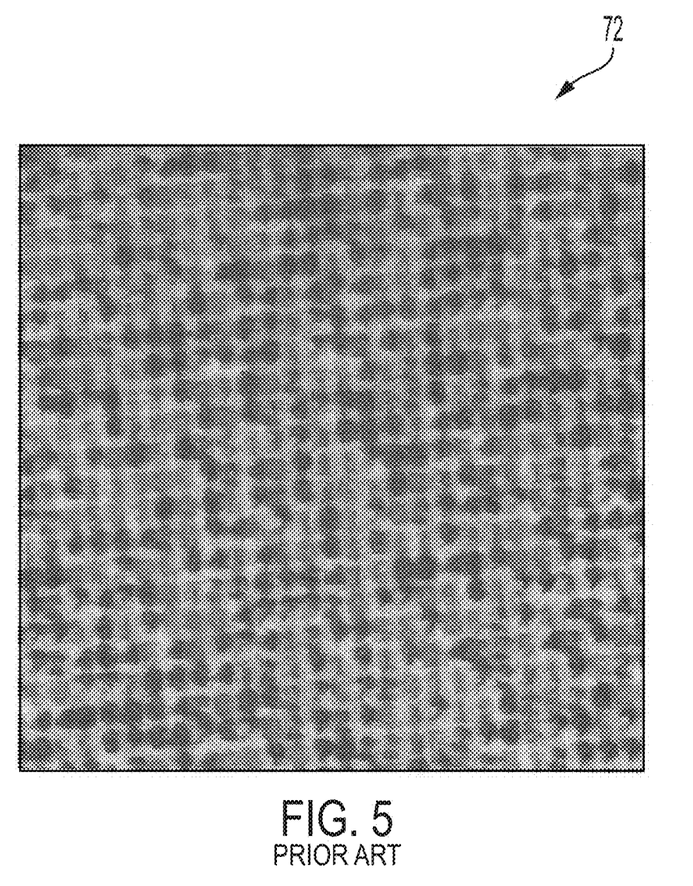
FIG. 5 illustrates an image depicting a zoomed view of the color microtext shown in FIG. 4.

FIG. 4 illustrates an image 70 depicting an example of color microtext. The image 70 shown in FIG. 4 illustrates 100000 places of the value of Pi ($\pi$) in color microtext. FIG. 5 illustrates an image 72 depicting a zoomed view of the color microtext shown in the image 70 in FIG. 4. The image 72 of FIG. 5 is a zoomed-in view of a portion or section of the image 70 depicted in FIG. 4. FIG. 4 and FIG. 5 together demonstrate how tiny text composed of multiple primary or spot colors starts to expand out and become unreadable (e.g., red, and green). These figures also demonstrate dot gain issues starting to make, for example, black "6" and "9" difficult to read.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide methods, systems and devices for generating improved specialty imaging effects.

It is a further aspect of the embodiments to provide methods, systems and devices for generating and rendering tiny text on a recording medium.

The aforementioned aspects and other objectives and advantages can now be achieved as described herein. In an embodiment, a method for defining characters, can involve selectively removing pixels from at least one character and rendering the at least one character with a user space equivalent to a device space.

In an embodiment, selectively removing the pixels from the at least one character can further involve: removing multiple abutting non-line pixels among the pixels from the at least one character.

In an embodiment, prior to selectively removing the pixels from the at least one character, the at least one character can be created, including the multiple abutting non-line pixels as expected for the at least one character.

In an embodiment, rendering the at least one character with a user space equivalent to a device space, can further involve: writing at least one of: pixel rectangles versus vectors or a bitmap.

An embodiment can further involve: forcing a position on pixel boundaries of the pixels.

An embodiment can also involve: forcing scaling of the pixels to a single size per dpi.

An embodiment can further involve: forcing a rotation of the pixels to at least of 0°, 90°, 180°, −90°.

In an embodiment, the at least one character can comprise text.

In an embodiment, the text can comprise microtext.

In an embodiment, a system for defining characters, can include a memory, a storage medium for storing data, a processor in communication with the storage medium and the memory, wherein the processor can execute machine readable instructions configured for: selectively removing pixels from at least one character; and rendering the at least one character with a user space equivalent to a device space.

In an embodiment, the instructions configured for selectively removing the pixels from the at least one character, can be further configured for: removing multiple abutting non-line pixels among the pixels from the at least one character.

In an embodiment, the instructions can be further configured for creating the at least one character including the multiple abutting non-line pixels as expected for the at least one character, prior to selectively removing the pixels from the at least one character.

In an embodiment, the instructions can be further configured for rendering the at least one character with a user space equivalent to a device space, further comprises writing at least one of: pixel rectangles versus vectors or a bitmap.

In an embodiment, the instructions can be further configured for forcing a position on pixel boundaries of the pixels.

In an embodiment, the instructions can be further configured for forcing scaling of the pixels to a single size per dpi.

In an embodiment, the instructions can be further configured for forcing a rotation of the pixels to at least of 0°, 90°, 180°, −90°.

In an embodiment, a non-transitory computer-readable storage medium can store a program for causing a processor to execute a method for rendering characters, the method comprising: selectively removing pixels from at least one character; and rendering the at least one character with a user space equivalent to a device space.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

It is important to note that while the drawings and figures presented herein are illustrated in black and white, they might have originally been created and displayed in color. As a result, those skilled in the art will understand that even though the images and figures may not display color, they may actually depict features in color.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" can be by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term L*a*b (also referred to as Lab or LAB) as utilized herein relates to the CIELAB color space (L*a*b), which is a color space defined by the International Commission on Illumination (CIE). L*a*b It expresses color as three values: L* for perceptual lightness and a* and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

The methodology below can be implemented to address problems outlined in the background section of this disclosure:

1. Create characters (e.g., 0 and 4) as expected which do not contain multiple abutting non-line pixels;
2. Remove non-line pixels from characters (e.g., 3 and 5) that contain multiple abutting non-line pixels;
3. Force position on pickle boundaries;
4. Force scale to a single size per dpi (dots per pixel); and
5. Force rotation to 0/90/180/-90 degrees.

Figure 6:
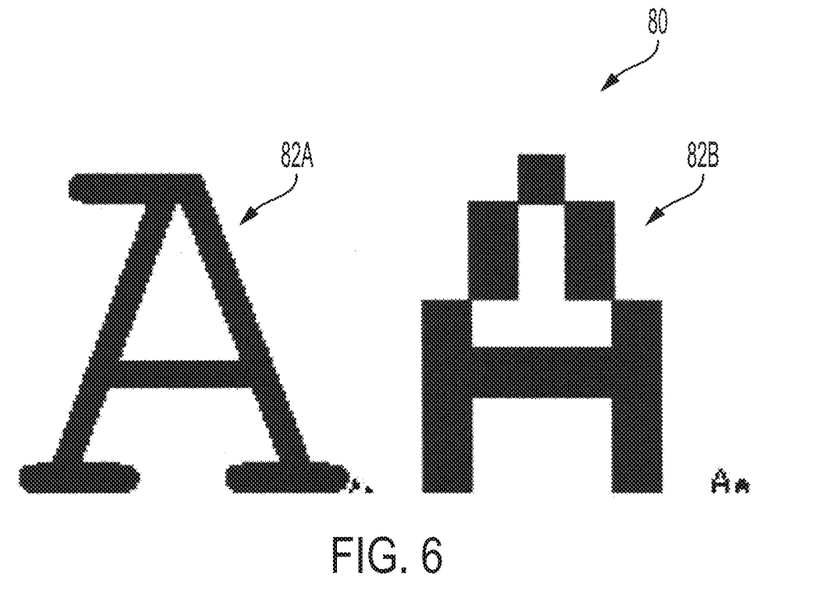
FIG. 6 illustrates a character after conversion from vector user space to device space, in accordance with an embodiment.

FIG. 6 illustrates a character 82A after conversion from vector user space to device space, in accordance with an embodiment. That is, character 82A is shown at the left side of FIG. 6 while the converter character 82A is shown at the right side of FIG. 6 as character 82B. FIG. 6 thus shows the character 82A after conversion from user space to device space. When zoomed there may be jagged edges. As the character becomes smaller, it degrades and becomes unreadable. On the right hand side character 82B is shown with text that is designed with device space in mind, meaning there are large, jagged edges when zoomed, but small sizes that are improved over the character 82A shown at the left side of FIG. 6.

Figure 7:
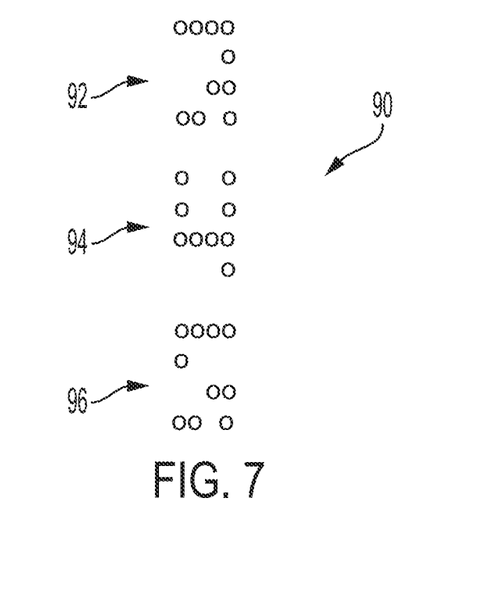
FIG. 7 illustrates characters with pixels removed, in accordance with an embodiment.

FIG. 7 illustrates characters 92, 94, and 96 with pixels removed, in accordance with an embodiment. Character 92 is the number 3 and character 96 is the number 5. Character 94 is the number 4. Thus, FIG. 7 shows the numbers 3 and 5 with pixels removed. The number 4 has multiple abutting pixels, but they are part of the same line and have not been removed.

Figure 8:
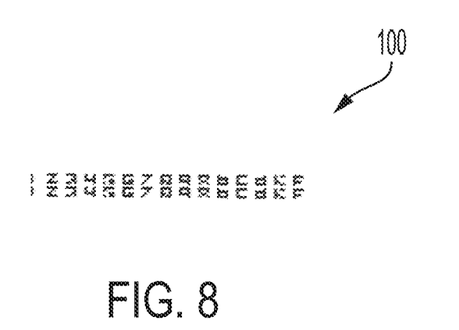
FIG. 8 illustrates an image of tinier text raster (pre-dot gain), in accordance with an embodiment.

FIG. 8 illustrates an image 100 of tinier text raster (pre-dot gain), in accordance with an embodiment. Note that in the context of text rasterization, "pre-dot gain" relates to a phenomenon related to the printing process, specifically in offset printing. Offset printing is a widely used method for reproducing text and images on paper, and it involves transferring ink from a printing plate to a rubber blanket and then onto the paper. Pre-dot gain occurs when the dots of ink on the printed page are larger or darker than intended. This can result in a loss of detail and clarity in the printed text or image. Pre-dot gain typically happens because the paper absorbs some of the ink, causing the dots to spread or "gain" in size as they make contact with the paper.

Figure 9:
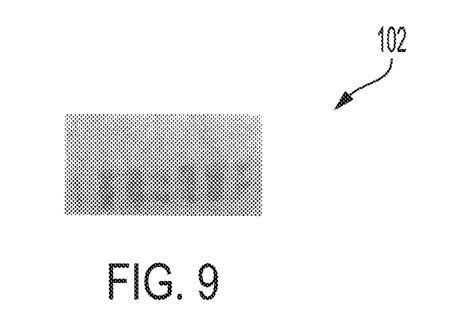
FIG. 9 illustrates an image depicting tinier text printed (with dot gain), in accordance with an embodiment.

FIG. 9 illustrates an image 102 depicting tinier text printed (with dot gain), in accordance with an embodiment. Note that dot gain can occur when the dots that make up an image or text on the printing plate become larger or spread during the printing process, leading to a loss of detail and potential changes in color density.

Figure 10:
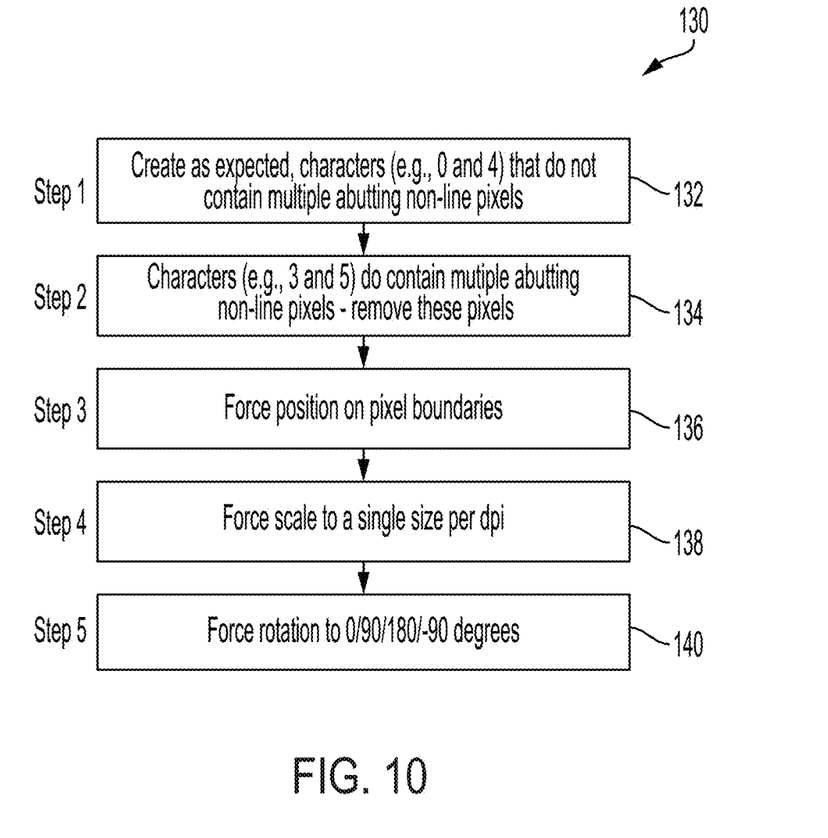
FIG. 10 illustrates a high-level flow chart of operation depicting logical operational steps of a method for pre-trapping text, in accordance with an embodiment.

FIG. 10 illustrates a high-level flow chart of operation depicting logical operational steps of a method 130 for generating characters to be printed as tiny text, in accordance with an embodiment. As shown at block 132, a first step or operation can be implemented to create characters (e.g., 0 and 4) as expected that do not contain abutting non-line pixels. Thereafter, as illustrated at block 134, a second step or operation can be implemented to remove non-line pixels from characters (e.g., 3 and 5) that contain multiple abutting non-line pixels. Note that the term "non-line pixels" as utilized herein can relate to pixels that are abutting and not part of the same vertical line such as shown in the left-most pixels in the "E" shown below, therefore this would be where pixels are removed.

0000
0
000
0000

That is, the bolded pixels shown above are abutting and not part of the same vertical line as the left-most pixels in the "E".

Next, as shown at block 136, a third step or operation can be implemented to force position on pixel boundaries. Then, as indicated at block 138, a fourth step or operation can be implemented to force scale to a single size per dpi. Thereafter, as shown at block 140, a fifth step or operation can be implemented to force rotation to 0/90/180/-90 degrees.

It should be appreciated that this approach solves the problem posed by current pixel ranges used in microtext products. For example, current microtext products range in sizes 6 to 9 pixels heights which includes one space pixel for placing rows of text. Below this size is under the minimum pixels to create, for example, an "E" or "3" as were done in line-space-line-space-line for 5 pixels plus the space pixel. The disclosed embodiments, however, can go to 5 pixels including one space pixel.

Figure 11:
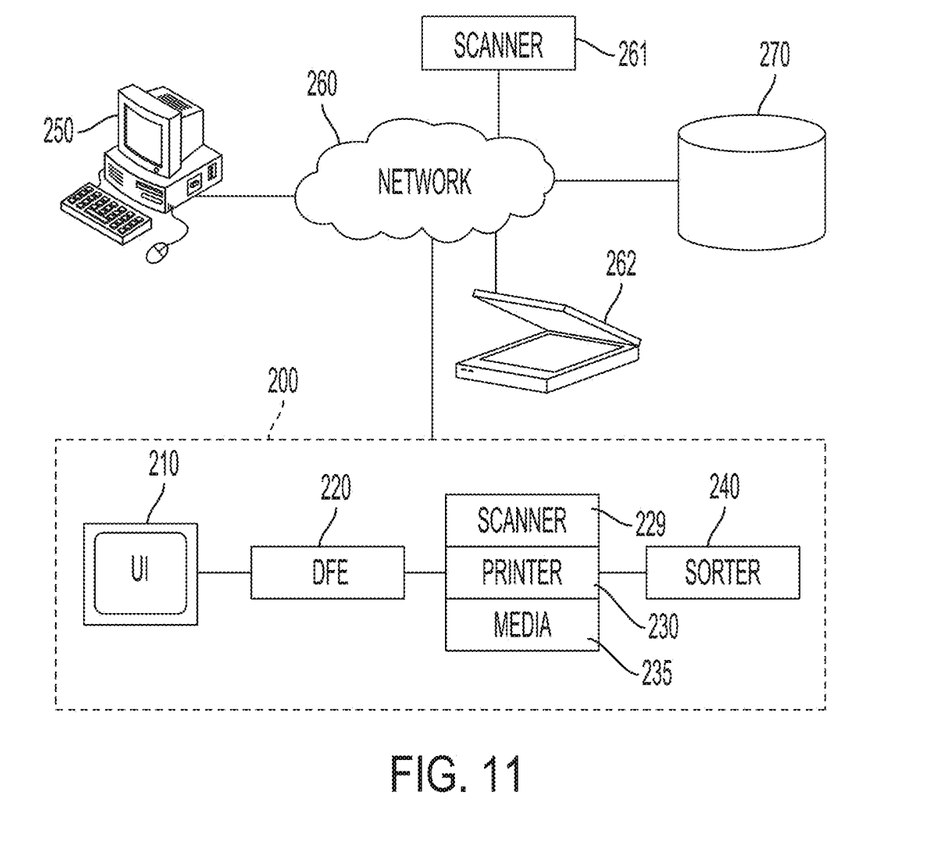
FIG. 11 illustrates a block diagram of a printing system suitable for implementing one or more of the disclosed embodiments.
Figure 12:
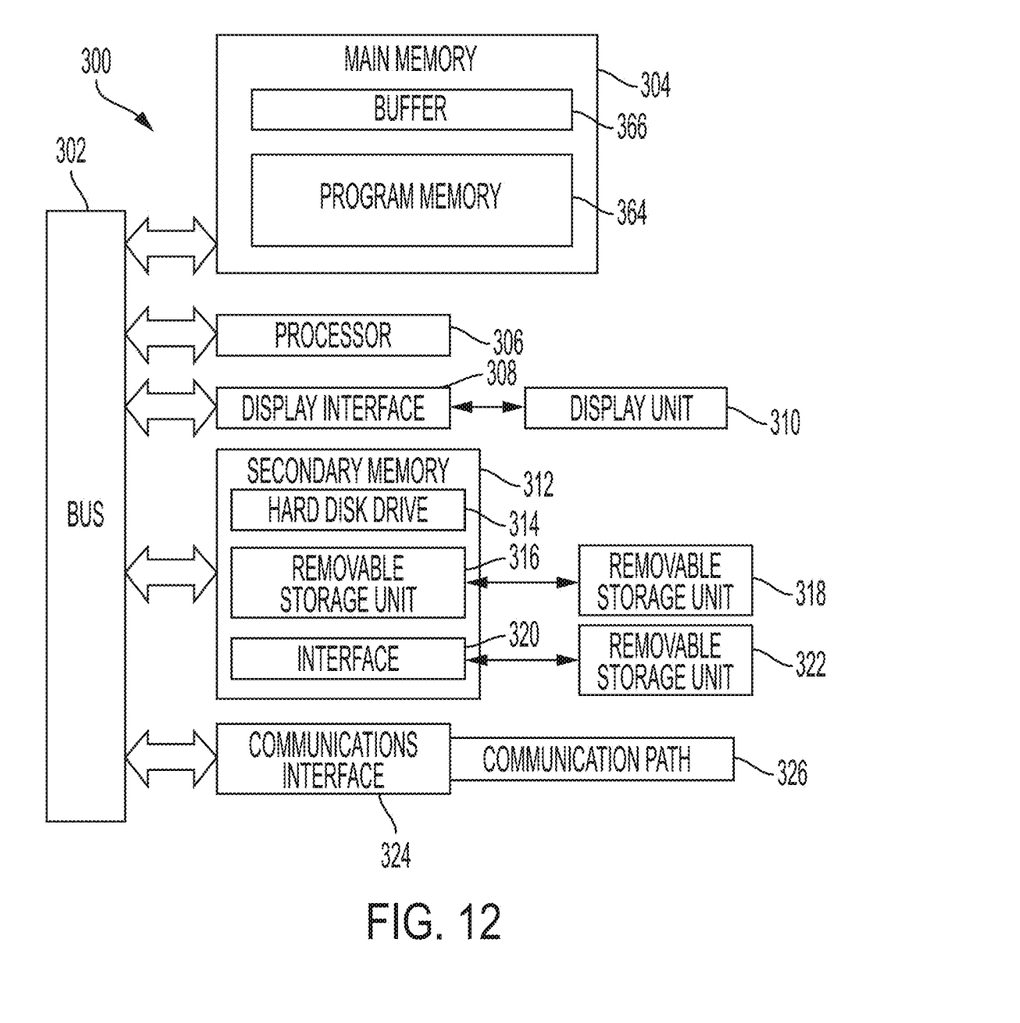
FIG. 12 illustrates a block diagram of a digital front-end controller useful for implementing one or more of the disclosed embodiments.

FIG. 11 illustrates a block diagram of a printing system 200 suitable for implementing one or more of the disclosed embodiments. FIG. 12 illustrates a block diagram of a digital front-end 300 useful for implementing one or more of the disclosed embodiments. The printing system 200 and/or the digital front-end 300 can be used to render (e.g., print) a recording medium (e.g., a document or substrate) with the pre-trapped text discussed herein. In some embodiments, the digital front-end 300 shown in FIG. 12 may be used to implement the digital front-end 220 shown in FIG. 11.

Note that the term 'character' as utilized herein can relate to characters of microtext, which can refer to the individual letters, numbers, symbols, or other graphical elements that make up the tiny text (e.g., microtext). These characters can be designed to be significantly smaller in size compared to standard text and are often not legible to the naked eye without the use of magnification.

With reference to FIG. 11, a printing system (or image rendering system) 200 suitable for implementing various aspects of the exemplary embodiments described herein is illustrated. The printing system 200 can implement rendering operations such as scanning a document via a scanner and printing a document via a printer, wherein the document includes the disclosed two-layer correlation mark with a variable data hiding layer. The printing system 200 can be used to implement, for example, the method 130 discussed herein with respect to FIG. 10.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 11. For example, the scanner 229 is shown in FIG. 11 as a part of the printing system 200. Alternatively, or in addition to the scanner 229 included as a part of the printing system 200, a scanner 261 and/or a scanner 262 may communicate with the printing system 200 through the network 260.

The terms "printer," "print device," and "printing system" as used herein can be utilized interchangeably to refer to the same rendering device or system and can encompass any apparatus and/or system; such as a digital copier, xerographic and reprographic printing systems, bookmaking machine, facsimile machine, multifunction machine, ink-jet machine, continuous feed, sheet-fed printing device, etc.; which may contain a print controller and a print engine and which may perform a print outputting function for any purpose.

A "print device" or a "printing system" is an electronic device that is capable of receiving commands and/or data, and in response printing characters and/or images on a substrate. Printing devices may include, but are not limited to, network printers, production printers, copiers and other devices using ink or toner, and scanners. A print device may also perform a combination of functions such as printing and scanning, in which case such a device may be considered a multifunction device.

The printing system 200 can include a user interface 210, the digital front-end (DFE) 220, and one or more print engines such as a print engine 230. The print engine 230 may have access to print media 235 of various sizes and in some cases the cost for a print job. In some embodiments, the printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path in some embodiments.

With respect to FIG. 12, an exemplary DFE (Digital Front End) 300 is shown in greater detail. The DFE 300 can include one or more processors, such as processor 306 capable of executing machine executable program instructions. The processor 306 can function as a DFE processor. The DFE shown in FIG. 12 may be utilized as or with the digital front end 220 of the printing system 200 shown in FIG. 11. Note that the term 'processor' as utilized herein can relate a component of an electronic device that executes programming instructions. The term "processor" may refer to either a single processor or to multiple processors that together implement various steps of a process. Unless the context specifically states that a single processor is required or that multiple processors are required, the term "processor" can include both the singular and plural embodiments.

In the embodiment shown, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., which can store computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can include a communications interface 324, which can act as an input and an output interface that can allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, can enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, some embodiments may be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein. Examples of such instructions include the operations described in the various blocks of the method 130 shown in FIG. 10.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 11 and/or the DFE controller 300 shown in FIG. 12. A "module" can perform the various steps, operations or instructions discussed herein, such as the steps or operations discussed herein with respect to FIG. 10 and elsewhere herein.

The method 100 shown in FIG. 10, for example, may be implemented, in part, in a computer program product comprising a module that may be executed by, for example, the DFE controller 220 (or the DFE 300 of FIG. 12). The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 11).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed examples discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventor has realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which a security device (e.g., a watermark) may be rendered.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for defining characters, comprising:
   selectively removing pixels from at least one character, wherein selectively removing the pixels from the at least one character comprises removing multiple abutting non-line pixels among the pixels from the at least one character; and
   rendering the at least one character with a user space equivalent to a device space.

2. The method of claim 1 further comprising prior to selectively removing the pixels from the at least one character, creating the at least one character including the multiple abutting non-line pixels as expected for the at least one character.

3. The method of claim 1 wherein rendering the at least one character with a user space equivalent to a device space, further comprises writing pixel rectangles versus vectors.

4. The method of claim 1 further comprising forcing a position on pixel boundaries of the pixels.

5. The method of claim 1 further comprising forcing scaling of the pixels to a single size per dpi.

6. The method of claim 1 further comprising forcing a rotation of the pixels to at least one of 0°, 90°, 180°, −90°.

7. The method of claim 1 wherein the at least one character comprises text.

8. The method of claim 7 wherein the text comprises microtext.

9. A system for defining characters, comprising:
   a memory;
   a storage medium for storing data; and
   a processor in communication with the storage medium and the memory, the processor executing machine readable instructions configured for:
      selectively removing pixels from at least one character, wherein selectively removing the pixels from the at least one character comprises removing multiple abutting non-line pixels among the pixels from the at least one character; and
      rendering the at least one character with a user space equivalent to a device space.

10. The system of claim 9 wherein the instructions are further configured for creating the at least one character including the multiple abutting non-line pixels as expected for the at least one character, prior to selectively removing the pixels from the at least one character.

11. The system of claim 9 wherein the instructions are further configured for rendering the at least one character with a user space equivalent to a device space, further comprises writing pixel rectangles versus vectors.

12. The system of claim 9 wherein the instructions are further configured for forcing a position on pixel boundaries of the pixels.

13. The system of claim 9 wherein the instructions are further configured for forcing scaling of the pixels to a single size per dpi.

14. The system of claim 9 wherein the instructions are further configured for forcing a rotation of the pixels to at least one of 0°, 90°, 180°, −90°.

15. The system of claim 9 wherein the at least one character comprises text.

16. The system of claim 15 wherein the text comprises microtext.

17. A non-transitory computer-readable storage medium storing a program for causing a processor to execute a method for rendering characters, the method comprising:
   selectively removing pixels from at least one character, wherein selectively removing the pixels from the at least one character comprises removing multiple abutting non-line pixels among the pixels from the at least one character; and
   rendering the at least one character with a user space equivalent to a device space, wherein rendering the at least one character with the user space equivalent to a device space comprises writing pixel rectangles versus vectors.

* * * * *